(12) United States Patent
Kubo et al.

(10) Patent No.: US 9,219,301 B2
(45) Date of Patent: Dec. 22, 2015

(54) ANTENNA DEVICE, BATTERY PACK WITH ANTENNA, AND COMMUNICATION TERMINAL DEVICE

(75) Inventors: Hiroyuki Kubo, Nagaokakyo (JP); Katsumi Taniguchi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 567 days.

(21) Appl. No.: 13/334,221

(22) Filed: Dec. 22, 2011

(65) Prior Publication Data

US 2012/0162028 A1    Jun. 28, 2012

(30) Foreign Application Priority Data

Dec. 24, 2010  (JP) ................................. 2010-288847
Feb. 23, 2011  (JP) ................................. 2011-037705

(51) Int. Cl.
*H01Q 1/24* (2006.01)
*H01Q 7/06* (2006.01)
*H01M 2/10* (2006.01)
*H01Q 1/38* (2006.01)
*H01Q 1/52* (2006.01)
*G06K 7/10* (2006.01)

(52) U.S. Cl.
CPC .............. *H01Q 1/243* (2013.01); *H01M 2/1066* (2013.01); *H01Q 1/38* (2013.01); *H01Q 1/528* (2013.01); *H01Q 7/06* (2013.01); *G06K 7/10336* (2013.01)

(58) Field of Classification Search
CPC ..... H01Q 1/528; H01Q 7/06; G06K 7/10336; H01M 2/1066

USPC .......................................................... 343/788
See application file for complete search history.

(56) References Cited

U.S. PATENT DOCUMENTS

| 7,000,837 | B2 | 2/2006 | Akiho et al. |
| 7,503,509 | B2 | 3/2009 | Aramaki et al. |
| 8,199,066 | B2 | 6/2012 | Kubo et al. |

(Continued)

FOREIGN PATENT DOCUMENTS

| CN | 101859923 A | 10/2010 |
| CN | 101897081 A | 11/2010 |

(Continued)

OTHER PUBLICATIONS

Japanese Office Action for corresponding application No. JP 2011-037705, date of dispatch May 7, 2013 (with English translation).

*Primary Examiner* — Sue A Purvis
*Assistant Examiner* — Michael Bouizza
(74) *Attorney, Agent, or Firm* — Arent Fox LLP

(57) ABSTRACT

A battery pack having a main surface and a side surface, and the external appearance thereof is an approximately rectangular parallelepiped shape. An antenna coil is provided on the main surface. The antenna coil is obtained by forming a coil conductor pattern on a flexible substrate. A substantially slit-shaped aperture is formed on the flexible substrate, and a magnetic material core is inserted into the aperture. In the antenna coil, the center of the coil aperture portion is offset from the center of the main surface of the battery pack in the outside edge portion direction of the main surface. A first end in the magnetic path direction of the magnetic material core is stretched along the side surface of the battery pack, and the second end of the magnetic material core is opened toward the center of the main surface of the battery pack.

23 Claims, 9 Drawing Sheets

(56) References Cited

U.S. PATENT DOCUMENTS

| | | |
|---|---|---|
| 8,604,992 B2 | 12/2013 | Kobayashi et al. |
| 2007/0052600 A1* | 3/2007 | Kamitani et al. ............. 343/702 |
| 2007/0095913 A1* | 5/2007 | Takahashi et al. ............ 235/451 |
| 2008/0003457 A1* | 1/2008 | Endo ......................... 428/692.1 |
| 2009/0066466 A1* | 3/2009 | Arimura ....................... 336/221 |
| 2009/0096694 A1 | 4/2009 | Ito et al. |
| 2011/0234014 A1* | 9/2011 | Kato et al. .................... 343/788 |
| 2013/0113662 A1 | 5/2013 | Kato et al. |

FOREIGN PATENT DOCUMENTS

| | | | |
|---|---|---|---|
| JP | 2002-325013 A | 11/2002 |
| JP | 2004-166176 A | 6/2004 |
| JP | 2005-228908 A | 8/2005 |
| JP | 2005-269599 A | 9/2005 |
| JP | 3121577 U | 5/2006 |
| JP | 2007-013662 A | 1/2007 |
| JP | 3956172 B2 | 8/2007 |
| JP | 4013987 B1 | 11/2007 |
| JP | 2010-154007 A | 7/2010 |
| JP | 2010-245776 A | 10/2010 |
| JP | 2010-252402 A | 11/2010 |
| JP | 2010-268306 A | 11/2010 |
| WO | WO-2010-122685 A1 | 10/2010 |

* cited by examiner

ANTENNA DEVICE, BATTERY PACK WITH ANTENNA, AND COMMUNICATION TERMINAL DEVICE

BACKGROUND OF THE INVENTION

1. Field of the Invention

The present invention relates to an antenna device, a battery pack with an antenna, and a communication terminal device each of which is available in a radio frequency identification (RFID) system or the like communicating with an external device through an electromagnetic field signal.

2. Description of the Related Art

In an RFID system in which a reader/writer and an RFID tag are caused to communicate with each other on the basis of a noncontact method and predetermined information is transmitted between the reader/writer and the RFID tag, each of the reader/writer and the RFID tag includes an antenna device used for transmitting and receiving a wireless signal. For example, in an HF band RFID system utilizing a 13.56 MHz band as a communication frequency, the antennae of the RFID tag and the reader/writer are configured using antenna coils, and an antenna coil on an RFID tag side and an antenna coil on a reader/writer side are coupled with each other mainly through an induction magnetic field.

In recent years, communication terminal devices such as mobile phones and the like have been equipped with antenna coils used for the HF band RFID system, and the communication terminal devices have been used as readers/writers or RFID tags, in many cases. However, within the chassis of the communication terminal device, conductive bodies (metal bodies) such as a liquid crystal display panel, a keyboard, an RF circuit substrate, a battery pack, and the like are provided. In addition, the induction magnetic field is prevented from being formed, owing to these conductive bodies, and it is difficult to secure a sufficient communication distance, in some cases.

Therefore, for example, as described in Japanese Patent No. 4013987, there has been known a structure in which an antenna device configured using an antenna coil and a magnetic material core is mounted on a circuit substrate and the end portion of the magnetic material core extends to wrap around the side surface of the circuit substrate.

Here, an example of the antenna device disclosed in Japanese Patent No. 4013987 will be illustrated in FIG. 1.

FIG. 1 is the perspective view of an antenna device 106. An antenna coil 206 is in close contact with and mounted on the main surface of a circuit substrate 1. The circuit substrate 1 is a substrate arranged at a predetermined position within a mobile phone terminal, and an RF circuit, a control circuit, and the like, not illustrated, are formed on the substrate. The circuit substrate 1 is arranged at a predetermined position within a chassis so to be parallel to the main surface of the mobile phone terminal. In addition, in the circuit substrate 1, on a surface facing a surface on which the antenna coil 206 is mounted, a ground electrode (not illustrated) is fully formed.

The antenna coil 206 is configured using a magnetic material core 60 and a coil 70. The magnetic material core 60 includes a first main surface and a second main surface, the first main surface and the second main surface face each other, and the second main surface faces the circuit substrate. In addition, on both the end portions of the magnetic material core 60, bending portions 61 and 62 along the side surfaces of the circuit substrate 1 are formed. Namely, the magnetic material core 60 is bent in the vicinities of the side surfaces of the circuit substrate 1.

On the first main surface of the magnetic material core 60, which does not face the circuit substrate 1, the coil 70 is formed using a coil conductor 65. The coil axis of the coil 70 is perpendicular to the first main surface. At the center of the coil 70, an aperture portion 63 in which no coil conductor 65 is formed is provided. A through hole is provided at a conductor end 66 of the coil 70, and an electrode provided on a surface of the circuit substrate 1 facing the antenna coil 206 and the conductor end 66 of the coil 70 are electrically connected to each other owing to soldering, thereby being finally connected to a terminal 7. A conductor end of the coil 70, which is located on a side opposite to the conductor end 66, is connected to a terminal 8. The terminals 7 and 8 are pattern electrodes formed on the circuit substrate 1, and connected to an RFID processing circuit on the circuit substrate 1, not illustrated.

According to this structure, it is possible to minimize the influence of such conductive bodies (metal bodies) as described above, and it is possible to secure a sufficient communication distance.

SUMMARY OF THE INVENTION

However, in the antenna device described in Japanese Patent No. 4013987, in order to avoid the influence of the conductive bodies, the antenna coil and the magnetic material core are configured so that the whole width direction of the circuit substrate is used. Therefore, the antenna coil and the magnetic material core tend to grow in size.

Accordingly, it is an object of the present invention to provide an antenna device achieving downsizing over all with securing a sufficient communication distance and reducing the sizes of the antenna coil and the magnetic material core, a battery pack with an antenna, and a communication terminal device including the antenna device and the battery pack.

According to preferred embodiments of the present invention, there is provided an antenna device that includes a conductive body including one main surface, the other main surface, and a side surface;

an antenna coil including a coil aperture portion provided on the one main surface of the conductive body; and a magnetic material core passing through the coil aperture portion (inserted into the aperture portion) of the antenna coil, wherein the center of the coil aperture portion in the antenna coil is disposed at a position offset from the center of the one main surface of the conductive body in an outside edge portion direction along the one main surface of the conductive body, and a first end in the magnetic path direction of the magnetic material core is located at a position along the side surface or the other main surface of the conductive body, and a second end on a side opposite to the first end of the magnetic material core is located at a position along the one main surface of the conductive body.

(2) It is desirable that, in the above-mentioned preferred embodiments, the magnetic material core includes a first main surface facing the conductive body and a second main surface that is an opposite surface of the first main surface, the antenna coil includes a first portion located on the first main surface side of the magnetic material core and a second portion located on the second main surface side of the magnetic material core and disposed at a position different from the first portion in planar view from a second main surface direction, and the first main surface of the magnetic material core is located on the one main surface side of the conductive body, and the second portion of the antenna coil is located in the vicinity of the outside edge portion of the conductive body.

(3) It is desirable that, in the above-mentioned preferred embodiments, the magnetic material core includes a first main surface facing the conductive body and a second main surface that is the opposite surface of the first main surface, the antenna coil includes a first portion located on the first main surface side of the magnetic material core and a second portion located on the second main surface side of the magnetic material core and disposed at a position different from the first portion in planar view from a second main surface direction, and the first main surface of the magnetic material core is located on the one main surface side of the conductive body, and the first portion of the antenna coil is located in the vicinity of the outside edge portion of the conductive body.

(4) It is desirable that, in any one of the above-mentioned embodiments, the outer edge of the antenna coil substantially overlaps with the outside edge portion of the conductive body.

(5) It is desirable that, in any one of the above-mentioned embodiments, the antenna coil includes an at least two-layered coil conductor in which a substantially loop-shaped or substantially spiral-shaped first coil conductor of a plurality of turns and a substantially loop-shaped or substantially spiral-shaped second coil conductor of a plurality of turns are laminated, and in at least a portion, the second coil conductor is located along between the first coil conductors when the first coil conductor and the second coil conductor are seen through.

(6) It is desirable that, in any one of the above-mentioned embodiments, the outside dimension (Y1) of the antenna coil in the insertion direction of the magnetic material core is less than or equal to one half of the length (Y2) of the one main surface of the conductive body in the insertion direction of the magnetic material core.

(7) It is desirable that, in any one of the above-mentioned embodiments, the magnetic material core has magnetic permeability differing depending on an insertion direction (X axis direction) to the coil aperture portion and a direction (Y axis direction) perpendicular to the insertion direction, and the insertion direction to the coil aperture portion corresponds to a direction in which the magnetic permeability is high.

(8) According to preferred embodiments of the present invention, there is provided a communication terminal device that includes an antenna device including a conductive body including one main surface, the other main surface, and a side surface, an antenna coil including a coil aperture portion provided on the one main surface of the conductive body, and a magnetic material core passing through the coil aperture portion (inserted into the aperture portion) of the antenna coil, wherein the center of the coil aperture portion in the antenna coil is disposed at a position offset from the center of the one main surface of the conductive body in an outside edge portion direction along the one main surface of the conductive body, and a first end in the magnetic path direction of the magnetic material core is located at a position along the side surface or the other main surface of the conductive body, and a second end on a side opposite to the first end of the magnetic material core is located at a position along the one main surface of the conductive body.

(9) It is desirable that, in the above-mentioned communication terminal device, the antenna coil is attached to the conductive body so that the insertion direction of the magnetic material core corresponds to the longitudinal direction of a communication terminal chassis.

(10) It is desirable that, in the above-mentioned communication terminal device, an antenna (main antenna) corresponding to a frequency band different from the antenna coil is provided in the communication terminal chassis, and the center of the coil aperture portion in the antenna coil is offset in a direction away from the antenna with respect to the conductive body in the longitudinal direction of the communication terminal chassis.

(11) According to preferred embodiments of the present invention, there is provided a battery pack with an antenna, including a battery pack including one main surface, the other main surface, and a side surface, an antenna coil including a coil aperture portion provided on the main surface of the battery pack, and a magnetic material core passing through the coil aperture portion (inserted into the aperture portion) of the antenna coil, wherein the center of the coil aperture portion in the antenna coil is disposed at a position offset from the center of the one main surface of the battery pack in an outside edge portion direction along the one main surface of the battery pack, and a first end in the magnetic path direction of the magnetic material core is located at a position along the side surface or the other main surface of the battery pack, and a second end on a side opposite to the first end of the magnetic material core is located at a position along the one main surface of the battery pack.

According to preferred embodiments of the present invention, it is possible to use the main surface of the conductive body as a magnetic focusing element (magnetic focusing surface) and furthermore, it is possible to form a large magnetic field loop in the main surface direction of the conductive body. Therefore, it is possible to secure a sufficient communication distance even if the sizes of the antenna coil and the magnetic material core are reduced.

Other features, elements, characteristics and advantages of the present invention will become more apparent from the following detailed description of preferred embodiments of the present invention with reference to the attached drawings.

DESCRIPTION OF THE PREFERRED EMBODIMENTS

First Embodiment

An antenna device according to a first embodiment is configured in a battery pack including an antenna used for an HF band RFID system. For example, this battery pack is a small thin battery pack embedded in a communication terminal device such as a mobile phone or the like, and is a secondary battery whose main body is contained in a metal case. The metal case is further protected by a resin case, and the leading wire of the secondary battery and the leading wire of the antenna are provided within the resin case.

Figure 1:
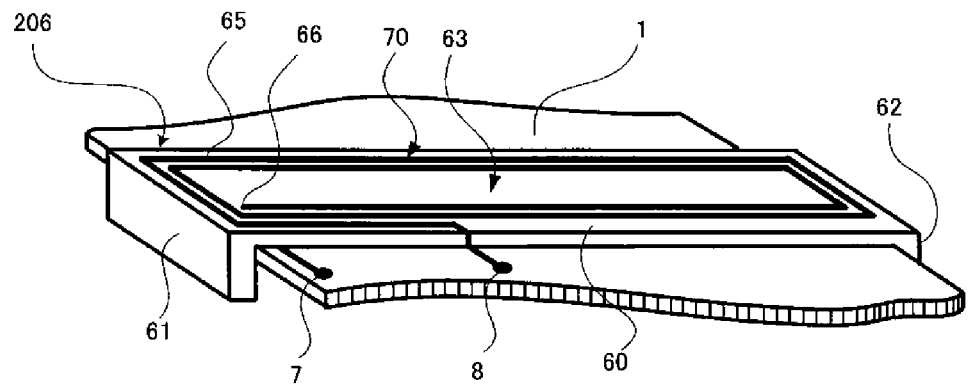
FIG. 1 is a perspective view of an antenna device illustrated in Japanese Patent No. 4013987.
Figure 2:
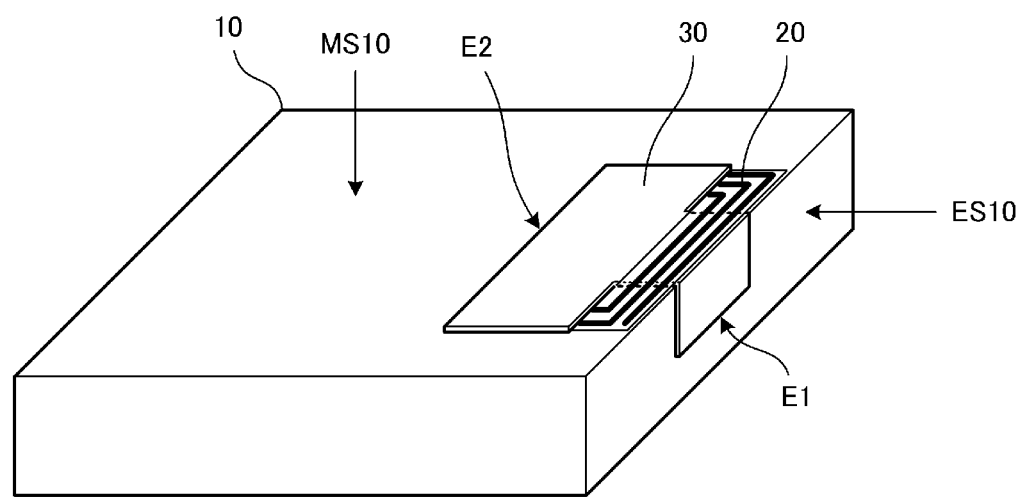
FIG. 2 is a perspective view of a battery pack with an antenna of a first embodiment.
Figure 3A:
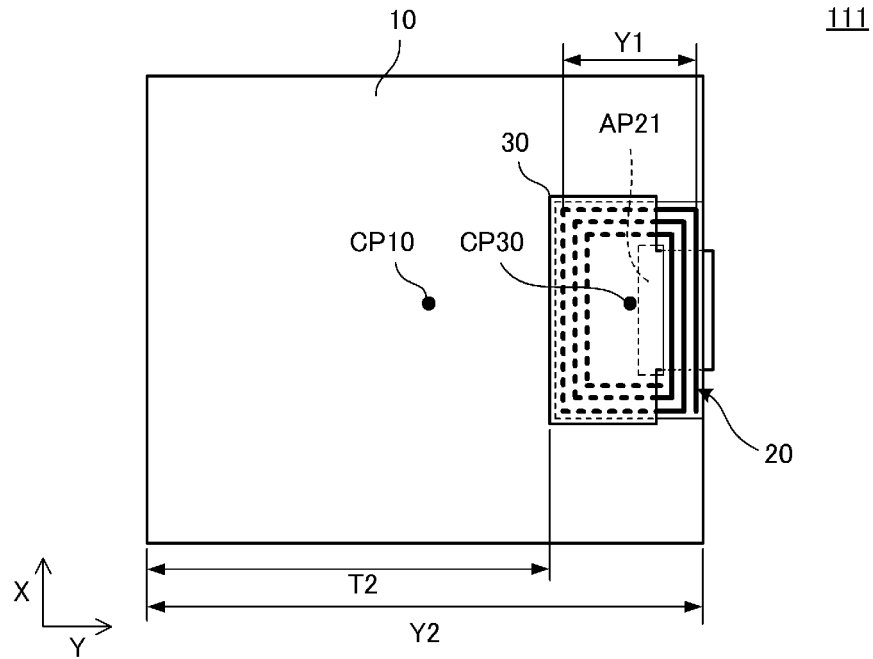
FIG. 3A is a plan view of the battery pack with an antenna.
Figure 3B:
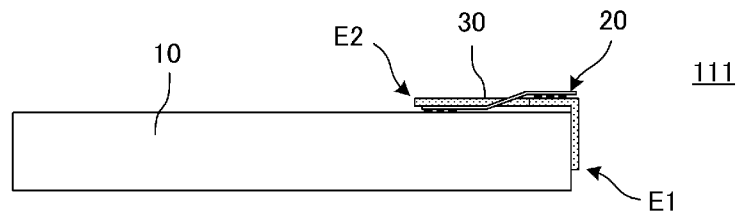
FIG. 3B is a front view thereof.
Figure 3C:
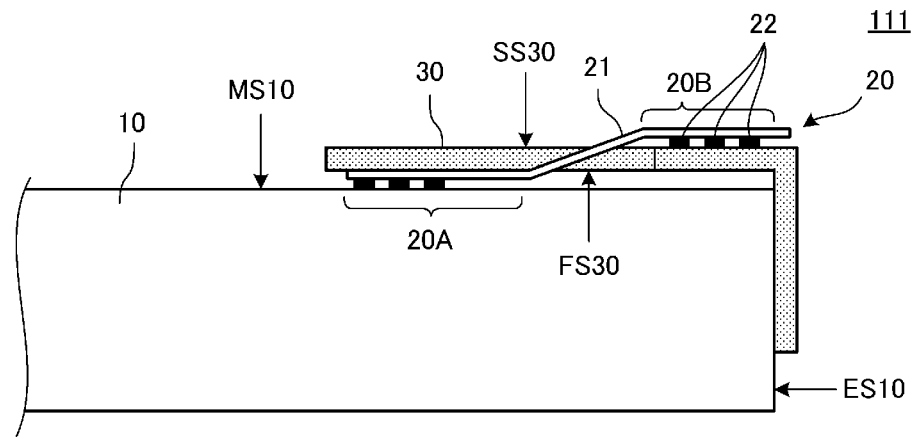
FIG. 3C is a partial enlarged view of FIG. 3B.

FIG. 2 is the perspective view of a battery pack 111 with an antenna. FIG. 3A is the plan view of the battery pack 111 with an antenna, and FIG. 3B is the front view thereof. FIG. 3C is the partial enlarged view of FIG. 3B. As illustrated in FIG. 2, FIG. 3A, FIG. 3B, and FIG. 3C, the battery pack 10 includes one main surface MS10, the other main surface, and a side surface ES10, and the external appearance thereof is an approximately rectangular parallelepiped shape. On the one main surface MS10, an antenna coil 20 is provided.

As illustrated in FIG. 3C, the antenna coil 20 is obtained by forming a coil conductor pattern 22 on a flexible substrate (sheet) 21. A substantially slit-shaped aperture AP21 is formed in the flexible substrate 21, and a magnetic material core 30 is inserted into the aperture AP21.

The antenna coil 20 and the magnetic material core 30 are integrated as an antenna coil unit, and the antenna coil unit is attached on the one main surface MS10 of the battery pack to the side surface ES10 thereof.

The antenna coil 20 is disposed so that the center CP30 of the coil aperture portion provided in the antenna coil 20 is offset from the center CP10 of the main surface MS10 of the battery pack in the outside edge portion direction of the main surface MS10. In coordinates illustrated in FIG. 3A, the center CP30 is offset in the positive direction of a Y axis. In addition, a first end E1 in the magnetic path direction of the magnetic material core 30 is stretched along the side surface ES10 of the battery pack 10, and a second end E2 of the magnetic material core 30, located on a side opposite to the first end E1, is opened toward the center CP10 of the main surface of the battery pack 10.

In addition, the outside dimension (the formation width of a coil conductor pattern) Y1 of the antenna coil 20 in the insertion direction of the magnetic material core 30 with respect to the coil aperture portion of the coil conductor pattern of the antenna coil 20 is substantially less than or equal to the one half of the length Y2 of the main surface MS10 of the battery pack 10 in the insertion direction of the magnetic material core 30.

The magnetic material core 30 is a magnetic substance where magnetic material such as ferrite or the like is molded into a substantially sheeted shape, and includes a first main surface FS30 facing the battery pack 10 and a second main surface SS30 facing the first main surface FS30. The antenna coil 20 includes a first portion 20A located on the first main surface FS30 side of the magnetic material core 30 and a second portion 20B located on the second main surface SS30 side of the magnetic material core 30 and disposed at a position different from the first portion 20A in planar view from the second main surface SS30.

In addition, the first main surface FS30 of the magnetic material core 30 is located on the main surface MS10 side of the battery pack 10, and the second portion 20B of the antenna coil 20 is located in the vicinity of the outside edge portion of the battery pack 10.

Figure 4A:
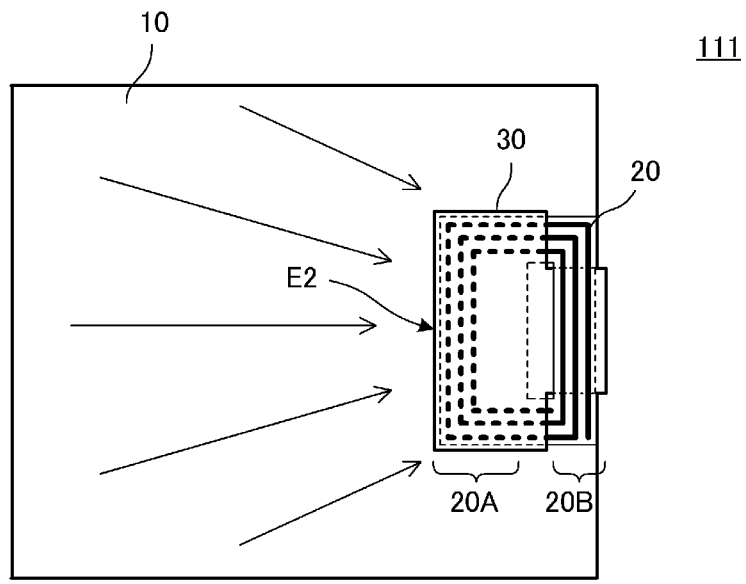
FIG. 4A is a diagram illustrating a magnetic flux interlinked with an antenna coil.
Figure 4B:
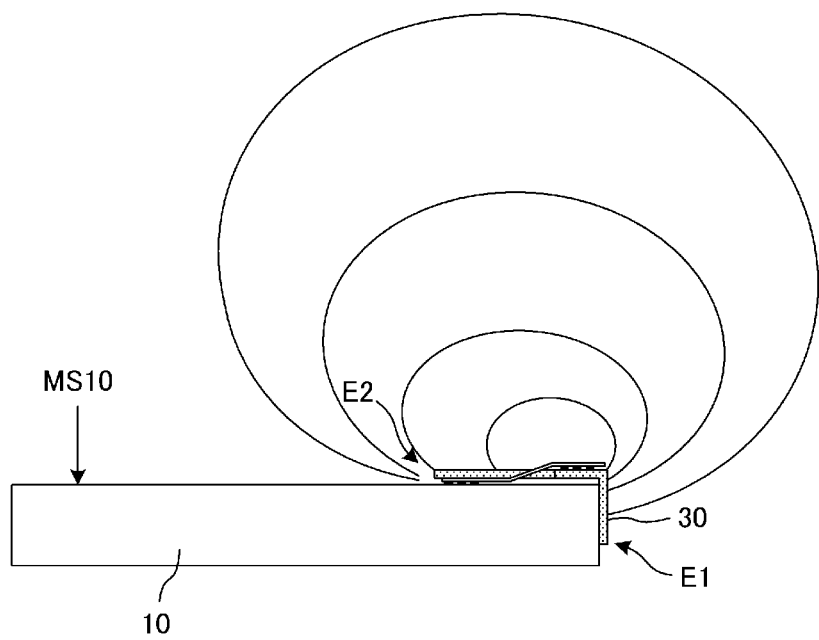
FIG. 4B is a diagram illustrating a magnetic flux loop.

FIG. 4A is a diagram illustrating a magnetic flux interlinked with the antenna coil 20, and FIG. 4B is a diagram illustrating a magnetic flux loop. As described above, the antenna coil 20 is disposed so that the center of the coil aperture portion is offset from the center of the main surface of the battery pack 10 in the outside edge portion direction of the main surface. In addition to this, the first end E1 of the magnetic material core 30 is stretched to the side surface of the battery pack 10, and the second end E2 of the magnetic material core 30 is opened toward the center of the main surface of the battery pack 10. Accordingly, as illustrated by arrow lines in FIG. 4A, magnetic fluxes are magnetically focused along the main surface of the battery pack 10 to pass through the coil aperture portion of the antenna coil 20. Furthermore, as illustrated by ellipses in FIG. 4B, since magnetic flux loops expanding along the main surface of the battery pack 10 are formed, it may be possible to secure a sufficient communication distance even if the sizes of the antenna coil 20 and the magnetic material core 30 are reduced.

As described above, the first main surface of the magnetic material core 30 is located on the main surface side of the battery pack 10, the second portion 20B of the antenna coil 20 is located in the vicinity of the outside edge portion of the battery pack 10, and furthermore, the antenna coil unit configured using the antenna coil 20 and the magnetic material core 30 is attached on the main surface MS10 of the battery pack. Therefore, the antenna device in the battery pack 111 with the antenna of the first embodiment may more easily pick up magnetic fluxes using the main surface of the battery pack 10. In particular, since the magnetic material core 30 is formed with a wide width on the central portion side of the battery pack 10, it may be possible to more easily pick up magnetic fluxes.

In addition, the antenna coil 20 is provided on the main surface of the battery pack 10 so that the outer edge end of the coil conductor pattern 22 nearly overlaps with the outside edge portion of the battery pack 10. Therefore, on the main surface of the battery pack 10, a magnetic flux is prevented from occurring from the neighborhood of the outside edge portion thereof. Namely, in the outside edge portion, owing to the second portion 20B of the antenna coil 20, it may be possible to prevent a magnetic flux from extending in the one main surface MS10 direction of the battery pack. Therefore, it may be possible to form a large magnetic field loop in the main surface direction of the battery pack 10.

In addition, the outside dimension (the formation width of the coil conductor pattern) Y1 of the antenna coil 20 in the insertion direction of the magnetic material core 30 with respect to the coil aperture portion of the coil conductor pattern 22 of the antenna coil 20 is substantially less than or equal to the one half of the length Y2 of the main surface MS10 of the battery pack 10 in the insertion direction of the magnetic material core 30. Therefore, it may be possible to downsize the antenna coil and the magnetic material core and it may be possible to effectively utilize the main surface area of the battery pack as a magnetic focusing element.

Second Embodiment

Figure 5A:
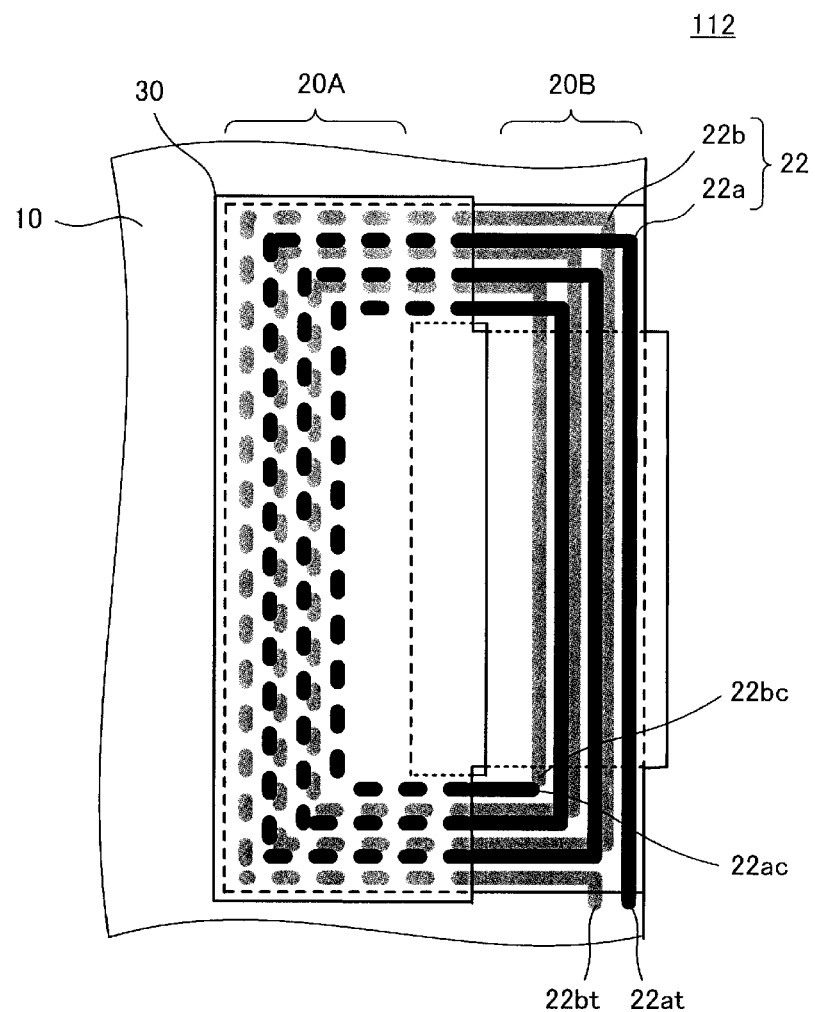
FIG. 5A is a partial plan view of a battery pack with an antenna of a second embodiment.
Figure 5B:
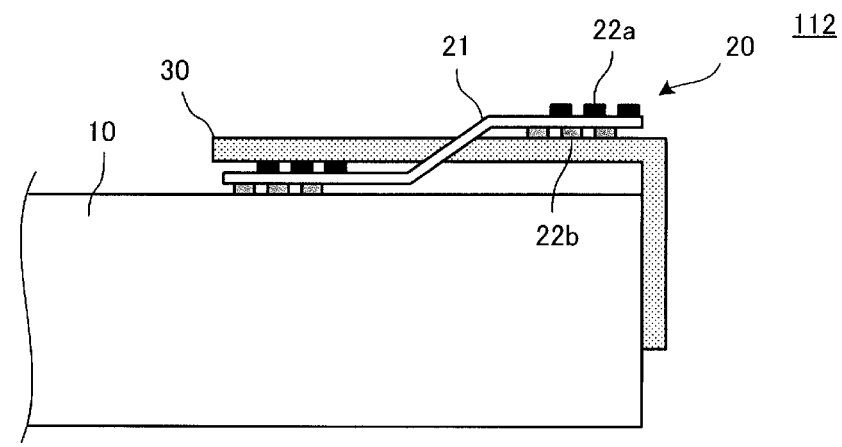
FIG. 5B is a front view thereof.

FIG. 5A is the partial plan view of a battery pack 112 with an antenna of a second embodiment, and FIG. 5B is the front view thereof.

While a coil conductor pattern of one layer is formed in the flexible substrate 21 in the first embodiment, a coil conductor pattern is formed in a plurality of layers in the second embodiment.

The antenna coil 20 includes a two-layered coil conductor pattern 22 where a substantially spiral-shaped first coil conductor pattern 22a of a plurality of turns and also a substantially spiral-shaped second coil conductor pattern 22b of a plurality of turns are laminated. The first coil conductor pattern 22a and the second coil conductor pattern 22b are provided on the front surface and the back surface of the flexible substrate 21, respectively. One end of the first coil conductor pattern 22a is connected to a first input-output terminal 22at, one end of the second coil conductor pattern 22b is connected to a second input-output terminal 22bt, and these input-output terminals are connected to a power feeding circuit. The other end 22ac of the first coil conductor pattern 22a and the other end 22bc of the second coil conductor pattern 22b are connected to each other through an interlayer connection conductor provided in an insulation sheet.

The first coil conductor pattern 22a and the second coil conductor pattern 22b are wound so that the directions of currents flowing therethrough are equal to each other. In addition, when the antenna coil 20 is seen through from the main surface direction of the battery pack 10, the first coil conductor pattern 22a and the second coil conductor pattern 22b are configured so that the coil conductor of the second coil conductor pattern 22b is located between the coil conductors of the first coil conductor pattern 22a. Namely, the first coil conductor pattern 22a and the second coil conductor pattern 22b are configured so that there is no clearance gap between coil conductors in a see-through state. Owing to this structure, magnetic fluxes passing between the first coil conductor pattern 22a and the second coil conductor pattern 22b are minimized, and a larger magnetic field loop easily occurs.

In addition, the coil conductor pattern may be laminated through an insulation layer.

Third Embodiment

Figure 6A:
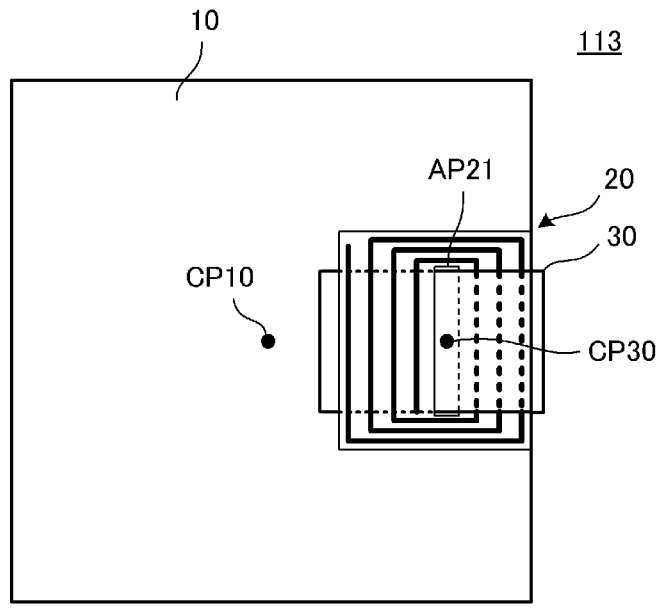
FIG. 6A is a plan view of a battery pack with an antenna of a third embodiment.
Figure 6B:
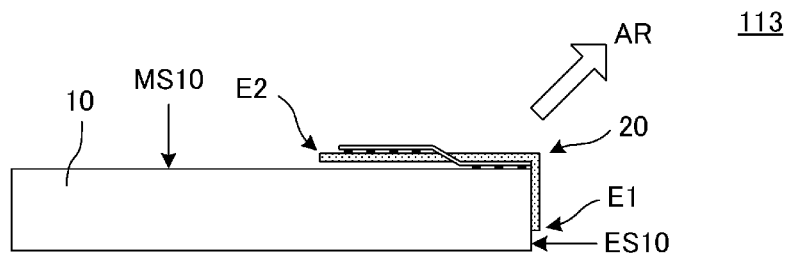
FIG. 6B is a front view thereof.
Figure 6C:
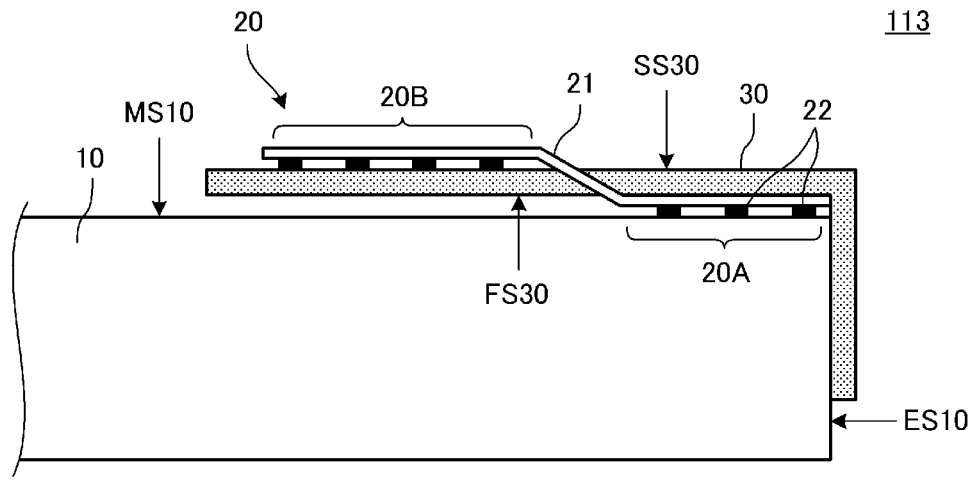
FIG. 6C is a partial enlarged view of FIG. 6B.

FIG. 6A is the plan view of a battery pack 113 with an antenna of a third embodiment, FIG. 6B is the front view thereof. FIG. 6C is the partial enlarged view of FIG. 6B. The battery pack 10 includes the main surface MS10 and the side surface ES10, and the external appearance thereof is an approximately rectangular parallelepiped shape. The antenna coil 20 is provided on the main surface MS10.

As illustrated in FIG. 6C, the antenna coil 20 is obtained by forming the coil conductor pattern 22 on the flexible substrate (sheet) 21. The substantially slit-shaped aperture AP21 is formed in the flexible substrate 21, and the magnetic material core 30 is inserted into the aperture AP21.

The antenna coil 20 and the magnetic material core 30 are integrated as an antenna coil unit, and the antenna coil unit is attached on from the main surface MS10 of the battery pack to the side surface ES10 thereof.

The antenna coil 20 is disposed so that the center CP30 of the coil aperture portion is offset from the center CP10 of the main surface MS10 of the battery pack in the outside edge portion direction of the main surface MS10. In addition, the first end E1 in the magnetic path direction of the magnetic material core 30 is stretched along the side surface ES10 of the battery pack 10, and the second end E2 of the magnetic material core 30, located on a side opposite to the first end E1, is opened toward the center CP10 of the main surface of the battery pack 10.

The magnetic material core 30 is a magnetic substance where magnetic material such as ferrite or the like is molded into a substantially sheeted shape, and includes the first main surface FS30 facing the battery pack 10 and the second main surface SS30 facing the first main surface FS30. The antenna coil 20 includes the first portion 20A located on the first main surface FS30 side of the magnetic material core 30 and the second portion 20B located on the second main surface SS30 side of the magnetic material core 30 and disposed at a position different from the first portion 20A in planar view from the second main surface SS30.

The first main surface FS30 of the magnetic material core 30 is located on the main surface MS10 side of the battery pack 10, and the first portion 20A of the antenna coil 20 is located in the vicinity of the outside edge portion of the battery pack 10.

In the case of such a configuration as described above, it may be possible to form a magnetic flux loop in which a magnetic flux extends in a direction indicated by an arrow AR in FIG. 6B, and directivity in the arrow AR direction is enhanced. Accordingly, it may be possible to increase a communication distance in the arrow AR direction.

Fourth Embodiment

In a fourth embodiment, three battery packs with antennae, which include magnetic material cores whose shape are different from one another, will be illustrated.

Figure 7A:
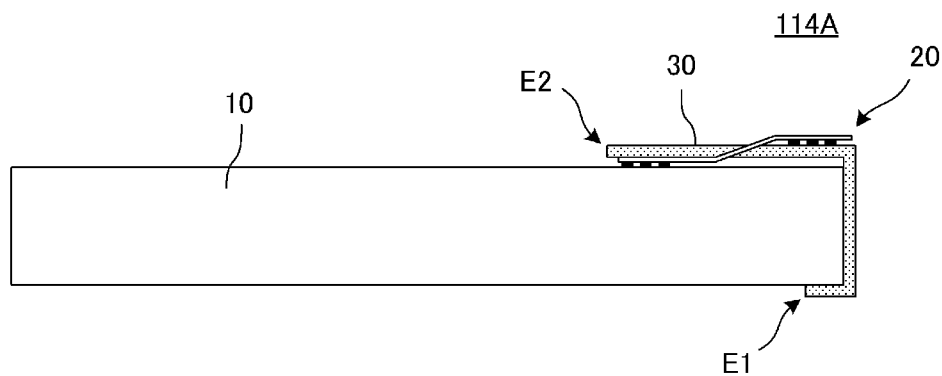
FIG. 7A, FIG. 7B, and FIG. 7C are front views of battery packs with antennae of a fourth embodiment, respectively.
Figure 7B:
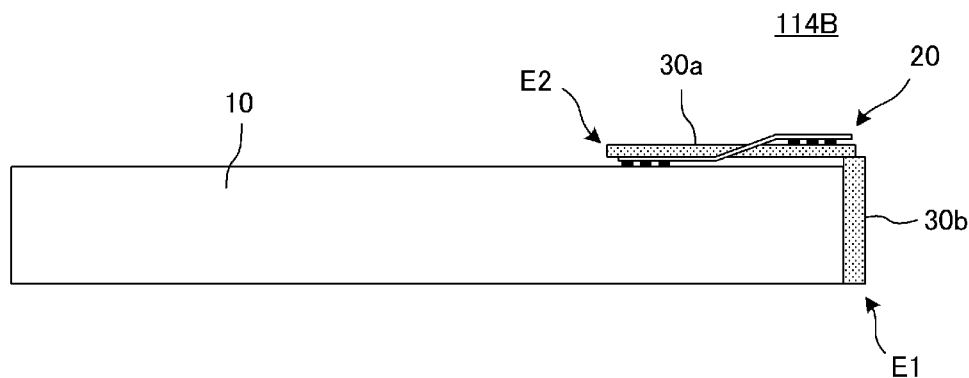
Figure 7C:
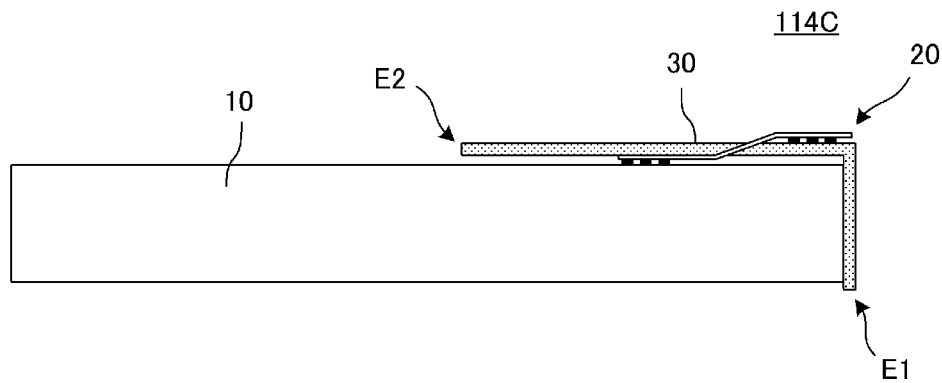

FIG. 7A, FIG. 7B, and FIG. 7C are the front views of battery packs 114A, 114B, and 114C with antennae, respectively. In each of the battery packs, an antenna coil unit configured using the antenna coil 20 and the magnetic material core 30 is attached on the battery pack 10. The basic configuration thereof is the same as that illustrated in the first embodiment.

As illustrated in FIG. 7A, the magnetic material core 30 may be formed so as to extend to wrap around the back surface (the other main surface) of the battery pack 10. In addition, as illustrated in FIG. 7B, a magnetic material core 30a on the main surface of the battery pack 10 and a magnetic material core 30b on the side surface of the battery pack 10 may not be a set of magnetic material cores and may be separately provided. In addition, as illustrated in FIG. 7C, the second end E2 of the magnetic material core 30 may be greatly protruded from the antenna coil 20, and may extend to the vicinity of the central portion of the main surface of the battery pack 10, and furthermore to a region covering the central portion. And first end E1 may extend past the back surface of the battery pack 10.

Fifth Embodiment

Figure 8A:
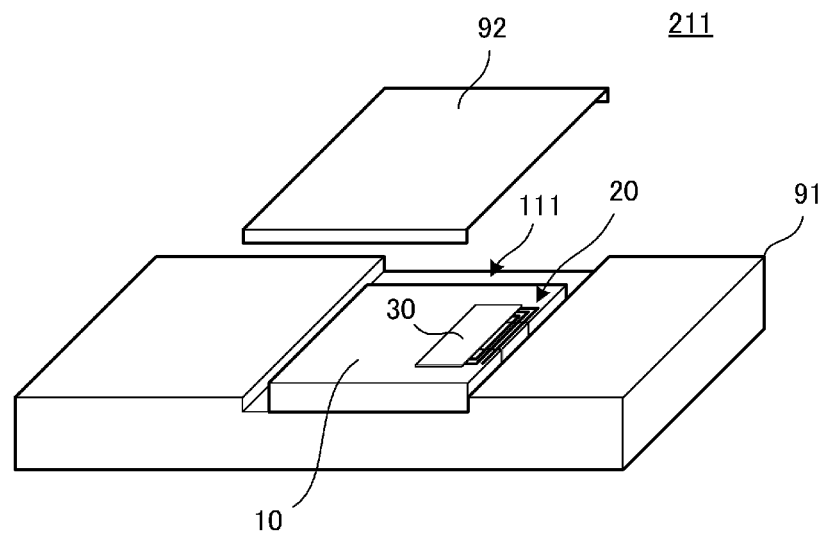
FIG. 8A is a perspective view of a communication terminal device of a fifth embodiment.
Figure 8B:
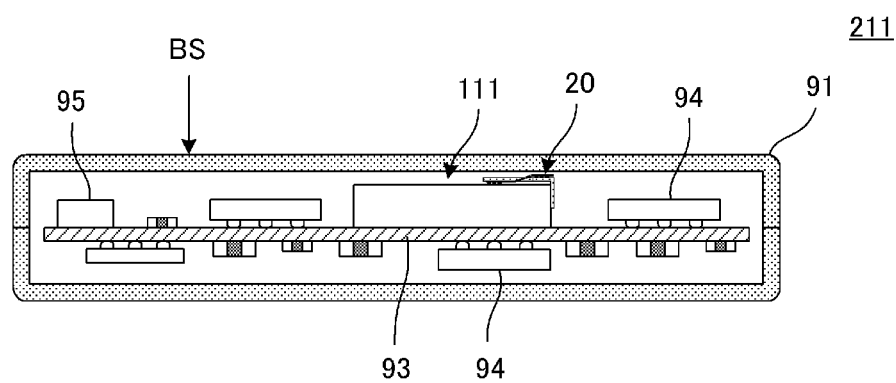
FIG. 8B is a vertical cross-sectional view thereof.

FIG. 8A is the perspective view of a communication terminal device 211 of a fifth embodiment, and FIG. 8B is the vertical cross-sectional view thereof.

A battery pack 111 with an antenna is mounted in a predetermined space on the back side of the chassis 91 of the communication terminal device 211. This battery pack 111 with an antenna corresponds to the battery pack illustrated in the first embodiment. A display unit and an input operation unit are provided on the front surface side of the chassis 91. In addition, a printed wiring board 93 equipped with various kinds of circuit components 94 is embedded within the chassis 91. Wiring line conductors and ground conductors used for mounting the various kinds of circuit components 94 are formed on the printed wiring board 93. In addition, on one end portion side of the chassis 91, a main antenna (antenna used for mobile phone communication) 95 is provided that corresponds to a frequency band different from the antenna coil 20.

The antenna coil 20 is attached to the battery pack 10 so that the insertion direction of the magnetic material core 30 corresponds to the longitudinal direction of the chassis 91. In addition, the antenna coil 20 is disposed with being offset in a direction in which the central portion of the coil aperture portion of the antenna coil 20 is away from the main antenna 95 in the longitudinal direction of the chassis 91.

In this way, the antenna coil 20 is disposed so that the insertion direction of the magnetic material core 30 corresponds to the longitudinal direction of the chassis 91 and the central portion of the antenna coil 20 is offset in a direction in which the central portion of the antenna coil 20 is away from the main antenna 95 in the longitudinal direction of the chassis 91. Accordingly, it may be easy to secure isolation between the antenna coil 20 and the main antenna 95. In addition, when an antenna for GPS, a wireless LAN, or the like is included in addition to the main antenna, it is desirable that the antenna coil 20 is disposed so as to be offset in a direction away from the these antennas.

Sixth Embodiment

While, in each of the embodiments illustrated above, the antenna coil utilizing the magnetic material core whose magnetic permeability has no directionality and the communication terminal device including the antenna coil have been exemplified, a sixth embodiment is an example in which a magnetic material core whose magnetic permeability has directionality is utilized.

Figure 9:
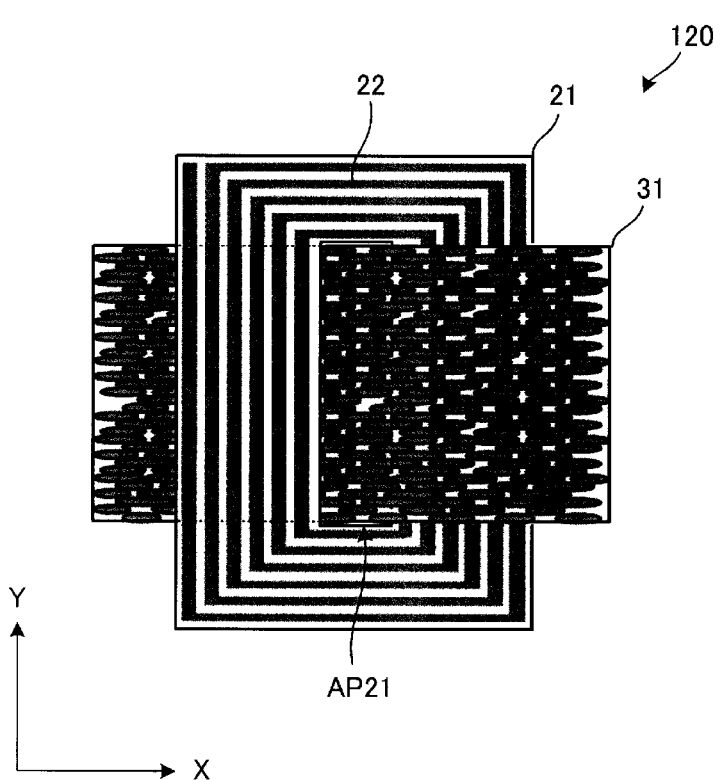
FIG. 9 is a plan view of an antenna coil of a sixth embodiment.

FIG. 9 is the plan view of an antenna coil 120 of the sixth embodiment. The antenna coil 120 includes the flexible substrate 21 on which a coil conductor pattern 22 is formed and a substantially plate-shaped magnetic material core 31. The coil conductor pattern 22 has a substantially rectangle spiral shape of a plurality of turns. The substantially slit-shaped aperture AP21 is provided in the coil aperture portion of this coil conductor pattern 22. In addition, the magnetic material core 31 is inserted into the aperture AP21.

The magnetic material core 31 has magnetic permeability differing depending on an insertion direction (X axis direction) to the coil aperture portion and a direction (Y axis direction) perpendicular to the insertion direction. Here, the magnetic material core 31 has the magnetic permeability higher in the insertion direction to the coil aperture portion than in the direction perpendicular to the insertion direction.

Specifically, the magnetic material core 31 is a substantially plate-shaped magnetic material core caused to have magnetic permeability anisotropy by subjecting substantially needle-shaped magnetic material powder (for example, ferrite powder) having a long axis and a short axis to orientational dispersion in a binder resin.

The configuration of the conductive body and an arrangement relationship between the conductive body and the antenna coil are the same as illustrated in each of the above-mentioned embodiments.

According to this antenna coil 120, magnetic fluxes are easily transmitted in the magnetic path direction of the magnetic material core 31 (a direction (X axis direction) in which main magnetic fluxes occurring owing to the flow of a current through the coil conductor pattern 22 trend), and it is hard for magnetic fluxes to flow in a direction (Y axis direction) perpendicular thereto. Therefore, magnetic fluxes effectively interlinked with the coil conductor pattern 22 are increased. Namely, it may be possible to effectively conduct magnetic fluxes to the side surface (furthermore, to the back surface) of the conductive body (for example, the battery pack). As a result, it may be possible to increase the communication distance with maintaining the size of the antenna coil or to reduce an antenna size with maintaining the communication distance.

Another Embodiment

While specific embodiments of the present invention have been illustrated as above, the present invention is not limited to the above-mentioned individual embodiments.

For example, the shape of the conductive body is not limited to a substantially rectangular parallelepiped shape or a substantially rectangular plate shape, and it is only necessary for the shape of the conductive body to have one main surface and the other main surface. In addition, for example, a shape surrounded by a virtual visible outline may be a substantially rectangular parallelepiped shape or a substantially rectangular plate shape. In addition, a slit or an aperture portion may be provided in the conductive body.

In addition, since the term "the center of one main surface of the conductive body" is a term used for indicating the representative position of the conductive body in planar view, the center is not limited to the geometric center of one main surface of the conductive body. Usually, it may be only necessary to consider that the center is the center of gravity located in one main surface of the conductive body.

In addition, while the antenna coil is a substantially planar coil in which the coil conductor pattern is wound in a substantially plane shape, the antenna coil is not limited to a single-layered coil, and may be a lamination-type coil in which a coil conductor pattern is stacked in a plurality of layers. In addition, it is not necessary for the antenna coil (planar coil) to be strictly a substantially plane-shaped coil, and, for example, the antenna coil may be bent to be configured as illustrated in FIGS. 3A to 3C.

In addition, since the term "the center of the coil aperture portion of the antenna coil" is a term used for indicating the representative position of the coil aperture portion of the antenna coil, the center is not limited to the geometric center of the coil aperture portion. Usually, it may be only necessary to consider that the center is the center of gravity of the coil aperture portion.

In addition, the coil aperture portion is not limited to a rectangle, and may be an arbitrary shape such as a polygonal shape, a looped curve, an oval, an ellipse, the combination of a straight line and a curved line, or the like.

In addition, while, as an example of the conductive body (metal body) to which the antenna coil is attached, the battery pack has been cited, this conductive body is not limited to the battery pack. In addition, a portion of the chassis of the communication terminal device is configured by the "conductive body" according to the present invention, and the portion may be used as the magnetic focusing element. In addition, a conductive body serving as the magnetic focusing element may be separately provided.

In addition, the shape of the battery pack is not limited to a substantially rectangular parallelepiped shape, and it is only necessary for the battery pack to include at least one main surface, a side surface concatenated to the one main surface, and the other main surface located on a side opposite to the one main surface. It is not necessary for the one main surface and the side surface to be perpendicular to each other. In addition, it is not necessary for the one main surface and the other main surface to be parallel planes.

In addition, in the antenna coil, it is not necessary for the first coil conductor and the second coil conductor to be directly (in point of a direct current) connected to each other, and the first coil conductor and the second coil conductor may be connected to each other through a capacitor. If the first coil conductor and the second coil conductor are connected to each other through a capacitor, it is not necessary to provide an interlayer conductor in the insulation sheet, and it is easy to manufacture the antenna coil.

In addition, while it is desirable that the first coil conductor and the second coil conductor overlap with each other so that there is no clearance gap at least in the vicinity of the outside edge portion (the second portion of the antenna coil) of the battery pack in planar view, a clearance gap may occur with respect to another portion (the first portion of the antenna coil). The first coil conductor and the second coil conductor are caused to overlap with each other so that there is no clearance gap, and hence it may be possible to reduce magnetic fields leaking from a clearance gap and it may be possible to increase the communication distance.

In addition, while a case has been illustrated in which the antenna coil is provided so that the outer edge end of the antenna coil is approximately located at the same position as that of the outside edge portion of the battery pack, the outer edge end of the antenna coil may be provided to extend to the side surface of the battery pack, and the outer edge end of the antenna coil may be provided on an inner side across a predetermined gap from the outside edge portion of the battery pack.

In addition, the coil conductor pattern of the antenna coil may be formed in a multilayer structure on one side or both sides of the flexible substrate. The number of the laminated layers and the number of turns of the coil conductor pattern may be arbitrarily designed in accordance with a necessary inductance value.

In addition, while, in the first embodiment, the magnetic material core is configured so as to have a width covering the antenna coil in the first portion of the antenna coil and to have a width approximately equal to the width of the coil aperture portion in the second portion, the magnetic material core may be configured so that the width thereof is the same width at one end portion and the other end portion. Furthermore, with respect to the magnetic material core, separate magnetic materials may be provided in the first portion and the second portion in the antenna coil, respectively.

In addition, the coil conductor pattern of the antenna coil is not limited to the substantially spiral shape, and may be a substantially loop shape. In addition, the coil conductor pattern of the antenna coil may be laminated across an insulation layer to have a substantially helical shape.

In addition, while it is desirable that the second end of the magnetic material core is located in the vicinity of the center position of one main surface of the conductive body, it may be only necessary for the second end of the magnetic material core to be located on the one main surface of the conductive body. In this regard, however, in view of downsizing the magnetic material core and effectively utilizing the conductive body as the magnetic focusing element, it is desirable that a dimension (T2 in the example illustrated in FIG. 3A) from the second end of the magnetic material core to the end portion of the conductive body is greater than or equal to one half of the length (Y2 in the example illustrated in FIG. 3A) of one main surface of the conductive body, and furthermore, one third thereof.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. An antenna device comprising:
    a conductive body including a first surface and a second surface that are parallel to one another, and a third surface connecting the first and second surfaces, where the third surface includes a portion that is perpendicular to the first and second surfaces;
    an antenna coil disposed adjacent the first surface of the conductive body and defining a coil aperture portion with a coil axis extending therethrough, the coil axis being an imaginary line about which the antenna coil is wound that extends in a direction that intersects the first surface of the conductive body; and
    a magnetic material core passing through the coil aperture portion of the antenna coil, wherein
    a center of the coil aperture portion of the antenna coil is positioned offset from a center of the first surface of the conductive body in a direction towards the third surface of the conductive body, and
    a first end in a magnetic path direction of the magnetic material core extends at least along the third surface of the conductive body, and a second end on a side opposite to the first end of the magnetic material core is positioned along the first surface of the conductive body.

2. The antenna device according to claim 1, wherein
    the magnetic material core includes a first main surface facing the conductive body and a second main surface that is an opposite surface of the first main surface, and
    the antenna coil includes a first portion located only on the first main surface of the magnetic material core and a second portion located only on the second main surface of the magnetic material core and disposed at a position different from the first portion in planar view from a second main surface direction.

3. The antenna device according to claim 1, wherein
    the magnetic material core includes a first main surface facing the conductive body and a second main surface that is an opposite surface of the first main surface, and
    the antenna coil includes a first portion located only on a first main surface side of the magnetic material core and a second portion located only on a second main surface side of the magnetic material core and disposed at a position different from the first portion in planar view from a second main surface direction.

4. The antenna device according to claim 1, wherein
    an edge of the antenna coil substantially overlaps with an edge portion of the conductive body.

5. The antenna device according to claim 1, wherein
    the antenna coil includes an at least two-layered coil conductor having a loop or spiral first coil conductor of a plurality of turns and a loop or spiral second coil conductor of a plurality of turns, and in at least a portion thereof, the second coil conductor is aligned between the plurality of turns of the first coil conductor.

6. The antenna device according to claim 1, wherein
    an outside dimension of the antenna coil in an insertion direction of the magnetic material core is less than or equal to one half of a length of the first surface of the conductive body in the insertion direction of the magnetic material core.

7. The antenna device according to claim 1, wherein
    the magnetic material core has a first magnetic permeability in an insertion direction relative to the coil aperture portion and a second magnetic permeability in a direction perpendicular to the insertion direction.

8. The antenna device according to claim 7, wherein the first magnetic permeability is greater than the second magnetic permeability.

9. The antenna device according to claim 1, wherein the first end of the magnetic material core further extends along the second surface of the conductive body.

10. The antenna device according to claim 1, wherein the magnetic material core includes a first portion adjacent the first surface and a second portion extending at least along the third surface.

11. The antenna device according to claim 1, wherein the antenna coil comprises a coil conductive pattern disposed on a flexible substrate.

12. The antenna device according to claim 2, wherein the first portion and the second portion of the antenna coil are planar and extend in a direction parallel to each other.

13. The antenna device according to claim 3, wherein the first portion and the second portion of the antenna coil are planar and extend in a direction parallel to each other.

14. A communication terminal device comprising:
an antenna device according to claim 1.

15. The communication terminal device according to claim 14, wherein
the antenna coil is attached to the conductive body so that an insertion direction of the magnetic material core corresponds to a longitudinal direction of a communication terminal chassis.

16. The communication terminal device according to claim 15, wherein
an antenna corresponding to a frequency band different from the antenna coil is provided in the communication terminal chassis, and the center of the coil aperture portion in the antenna coil is offset in a direction away from the antenna with respect to the conductive body in the longitudinal direction of the communication terminal chassis.

17. A battery pack with an antenna, comprising:
a battery pack body including a first surface and a second surface that are parallel to one another, and a third surface connecting the first and second surfaces, where the third surface includes a portion that is perpendicular to the first and second surfaces;
an antenna coil disposed adjacent the first surface of the battery pack body and coil including a coil aperture portion with a coil axis extending therethrough, the coil axis being an imaginary line about which the antenna coil is wound that extends in a direction that intersects the first surface of the conductive body; and
a magnetic material core passing through the coil aperture portion of the antenna coil, wherein
a center of the coil aperture portion in the antenna coil is positioned offset from a center of the first surface of the battery pack body in a direction towards the third surface of the battery pack body, and
a first end in a magnetic path direction of the magnetic material core extends along at least the third surface of the battery pack body, and a second end on a side opposite to the first end of the magnetic material core is positioned along the first surface of the battery pack body.

18. The antenna device according to claim 17, wherein the antenna coil includes an at least two-layered coil conductor having a loop or spiral first coil conductor of a plurality of turns and a loop or spiral second coil conductor of a plurality of turns, and in at least a portion thereof, the second coil conductor is aligned between the plurality of turns of the first coil conductor.

19. The antenna device according to claim 17, wherein
an outside dimension of the antenna coil in an insertion direction of the magnetic material core is less than or equal to one half of a length of the first surface of the battery pack body in the insertion direction of the magnetic material core.

20. The antenna device according to claim 17, wherein
the magnetic material core has a first magnetic permeability in an insertion direction relative to the coil aperture portion and a second magnetic permeability in a direction perpendicular to the insertion direction.

21. The antenna device according to claim 20, wherein the first magnetic permeability is greater than the second magnetic permeability.

22. The antenna device according to claim 17, wherein the first end of the magnetic material core further extends along the second surface of the battery pack body.

23. The antenna device according to claim 17, wherein the antenna coil comprises a coil conductive pattern disposed on a flexible substrate.

* * * * *